(12) United States Patent
Forman et al.

(10) Patent No.: US 7,792,353 B2
(45) Date of Patent: Sep. 7, 2010

(54) RETRAINING A MACHINE-LEARNING CLASSIFIER USING RE-LABELED TRAINING SAMPLES

(75) Inventors: George Forman, Port Orchard, WA (US); Henri Jacques Suermondt, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 981 days.

(21) Appl. No.: 11/555,036

(22) Filed: Oct. 31, 2006

(65) Prior Publication Data

US 2008/0103996 A1    May 1, 2008

(51) Int. Cl.
*G06K 9/62* (2006.01)
(52) U.S. Cl. ........................... 382/159; 382/224
(58) Field of Classification Search ......... 382/155–159, 382/224, 180, 218, 225; 700/47, 48
See application file for complete search history.

(56) References Cited

U.S. PATENT DOCUMENTS 7,512,582 B2 * 3/2009 Cao et al. ..................... 706/55
2002/0164070 A1 * 11/2002 Kuhner et al. ............... 382/159
2008/0027725 A1 * 1/2008 Chu et al. .................... 704/257

OTHER PUBLICATIONS

Melville, P. and Mooney, R, "Diverse ensembles for active learning," Proc. of the 21st Int'l Conf. on Machine Learning (ICML, Banff), 584-591, 2004.
L. Li, A. Pratap, H.-T. Lin, and Y. S. Abu-Mostafa, "Improving Generalization by Data Categorization," in A. Jorge et al., eds., Knowledge Discovery in Databases: PKDD 2005, vol. 3721 of Lecture Notes in Artificial Intelligence, pp. 157-168. Springer-Verlag, 2005.
International Conference in Machine Learning, Morgan Kauffman, San Francisco, CA, 2001.

* cited by examiner

*Primary Examiner*—Daniel G Mariam (57) ABSTRACT

Provided are systems, methods and techniques for machine learning. In one representative embodiment, a training set that includes training samples and corresponding assigned classification labels is obtained, and an automated classifier is trained against the training set. At least one of the training samples is selected and confirmation/re-labeling of it is requested. In response, a reply classification label is received and is used to retrain the automated classifier.

18 Claims, 4 Drawing Sheets

RETRAINING A MACHINE-LEARNING CLASSIFIER USING RE-LABELED TRAINING SAMPLES

FIELD OF THE INVENTION

The present invention pertains to machine learning and is particularly applicable to systems, methods and techniques for retraining a machine-learning classifier using re-labeled training samples.

BACKGROUND

A great deal of attention has been given to automated machine-learning techniques. One area of study focuses on automated classification of input samples. For example, as the volume of digital data has exploded in recent years, there is significant demand for techniques to organize, sort and/or identify such data in a manner that allows it to be useful for a specified purpose.

Automated classification of digital information has application in a number of different practical situations, including image recognition (e.g., identifying which photographs from among thousands or millions in a database include a picture of a face or a picture of a particular face), text classification (e.g., determining whether a particular e-mail message is spam based on its textual content), and the like.

Various approaches to automated classification problems have been used. These approaches include supervised techniques, such as Support Vector Machine (SVM) and Naïve Bayes, in which a classifier is trained using a set of training samples for which labels have been assigned, typically by a human being who is an expert in the particular classification problem.

For this purpose, the training samples often are selected from the much larger group of samples to be classified. In some cases, the training samples are randomly selected. In others, the training samples are selected in a systematic manner according to pre-specified criteria. Active learning is one example of the latter approach.

Generally speaking, active-learning methods construct training sets iteratively, starting from a small initial set and then expanding that set incrementally by selecting examples deemed "most interesting" by the classifier at each iteration. The "most interesting" samples ordinarily are those that are closest to the decision boundary or where there otherwise is greater uncertainty as to whether the classification predicted by the classifier is correct.

However, the present inventors have identified certain shortcomings of conventional techniques for selecting training samples, such as active learning.

DESCRIPTION OF THE PREFERRED EMBODIMENT(S)

Figure 1:
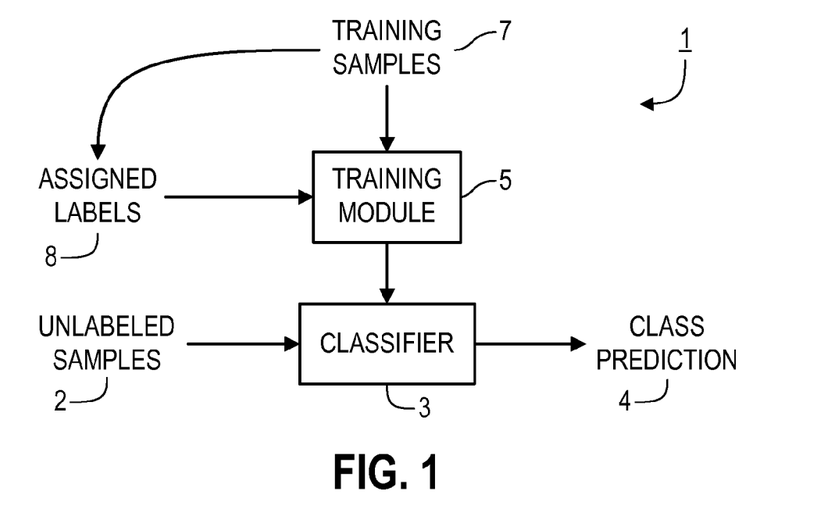
FIG. 1 is a block diagram illustrating a system according to a representative embodiment of the present invention.

FIG. 1 is a block diagram illustrating a system 1 according to a representative embodiment of the present invention. In production use, unlabeled samples 2 are input into an automated classifier 3 that then outputs a corresponding class prediction 4 for each such sample. The samples 2 can comprise, e.g., text, images, video, or signals representing any physical phenomenon (e.g., sound, pressure, radiation, temperature and/or light). Such samples 2 typically are represented for purposes of classification by automated classifier 3 as a set of feature values, as discussed in more detail below.

Classifier 3 applies a predetermined algorithm based on a supervised learning technique (e.g., Support Vector Machines or Naïve Bayes) in order to obtain class predictions 4. For that purpose, a training module 5 sets the classification parameters (e.g., weights) of classifier 3 using a set of training samples 7 and class labels 8 that have been assigned to such training samples 7, typically by a human being. While conventional techniques generally assume that the assigned classification labels 8 are correct, in the preferred embodiments of the present invention such labels 8 are repeatedly questioned and some of them may be submitted for confirmation/re-labeling if they do not appear to conform to the underlying model used by classifier 3, as discussed in more detail below.

Figure 2:
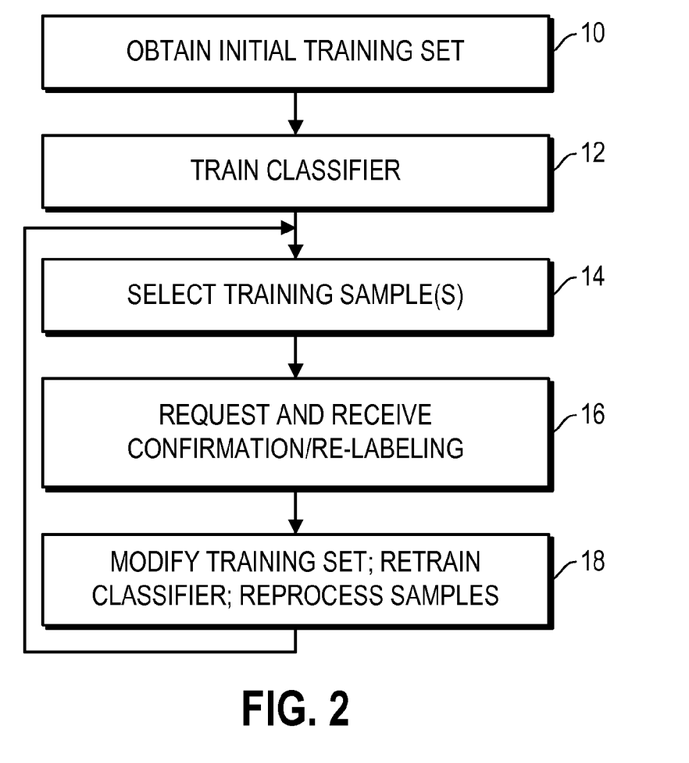
FIG. 2 is a flow diagram illustrating a machine-learning process according to a first representative embodiment of the present invention.

FIG. 2 is a flow diagram illustrating a machine-learning process according to a representative embodiment of the present invention. Ordinarily, the entire process illustrated in FIG. 2 is implemented entirely in software, e.g., by reading software code from a computer-readable medium. However, in alternate embodiments the process instead is implemented in any of the other ways discussed herein. The following discussion also references the block diagram of FIG. 3, which shows one example of a system 40 for implementing the process (again, with the individual components preferably implemented in software).

Referring to FIG. 2, initially (in step 10) an initial training set 45 (shown in FIG. 3) is obtained. Initial training set 45 could have been generated in the conventional manner. That is, referring to FIG. 3, various samples 7 are selected and designated for labeling. Ordinarily, the samples 7 are chosen so as to be representative of the types of samples which one desires to classify using the resulting machine-learning classifier (e.g., unlabeled samples 8). For example, if one wished to classify a large volume of text-based articles into different subject-matter categories, then the samples 7 preferably would constitute a representative cross-section of such articles. Any of a variety of different (e.g., conventional) techniques can be used for selecting the initial training samples 7. Alternatively, or in addition, depending for example upon when the process illustrated in FIG. 2 is invoked, the initial training samples 7 could have been generated in whole or in part by the techniques of the present invention. In any event, however, training set 45 subsequently is modified using the techniques of the present invention, as discussed in more detail below.

Figure 3:
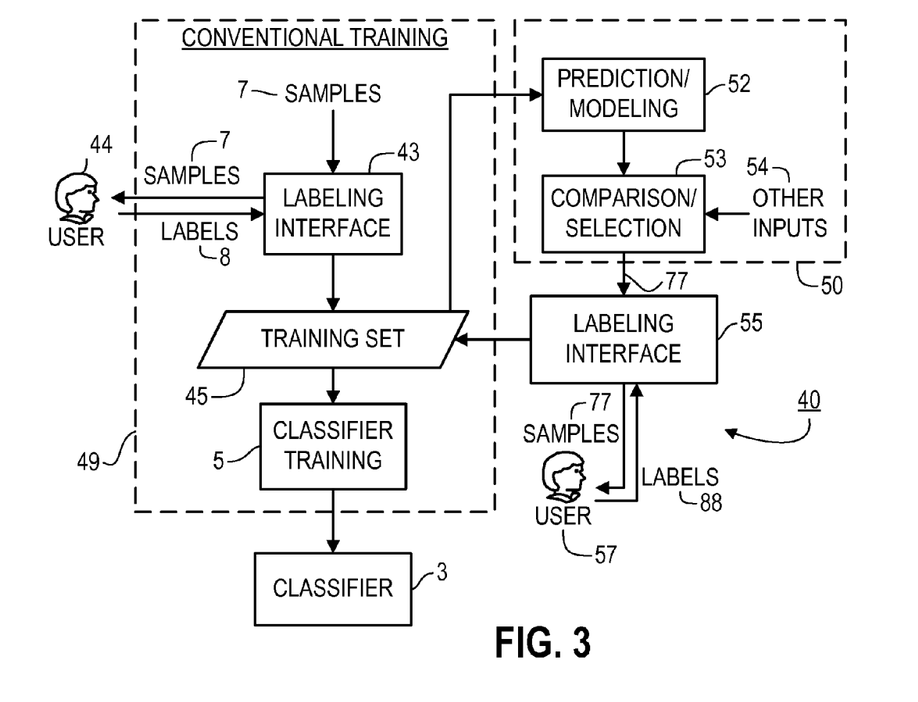
FIG. 3 is a block diagram illustrating a system for machine learning according to a representative embodiment of the present invention.

The selected samples 7 are labeled via interface module 43 in order to generate the training set 45, which includes the set of samples and their assigned labels. More preferably, module 43 provides a user interface which allows a user 44 to designate an appropriate label for each presented training sample 7. In one representative embodiment, module 43 displays to user 44 (here, a human domain expert) each sample 7 together with a set of radio buttons. The user 44 then clicks on one of the radio buttons, thereby designating the appropriate label for the sample 7.

More accurately, the training set 45 typically includes some representation of the samples 7, rather than the actual samples themselves, together with the samples' assigned labels. That representation ordinarily is a set of values for certain features, where the individual features have been chosen for their believed ability to help predict correct labels for the subject sample types, and where the same feature set is used across all of the samples 2 and 7. Thus, a vector of values corresponding to such features represents a single sample (in this case, one of the samples 7). However, for the purpose of the present description, both the samples and their representations are referred to as the "samples". Any of a variety of different (e.g., conventional) techniques for selecting the feature set can be used.

Referring back to FIG. 2, in step 12 the classifier 3 is trained, e.g., using training module 5 (shown also in FIG. 3). Generally speaking, the training involves attempting to find an optimal (according to some underlying criteria) mapping from the supplied feature set values for the samples 7 to the corresponding classification labels 8, so that the resulting classifier 3 can receive new unlabeled samples 2 and provide classification labels 4 for them based on its best guess in view of the feature set values for such unlabeled samples 2. Any of a variety of different (e.g., conventional) training techniques can be used by training module 5.

It is noted that the portion 49 of system 40 can be implemented as a conventional automated classifier-training system. However, according to the present embodiment, previously labeled samples 7 are selected from training set 45 and submitted for confirmation/re-labeling, e.g., as set forth in the following discussion.

As used herein, "confirmation/re-labeling" refers to the process of submitting an existing training sample for labeling so that its previously assigned label is either confirmed or contradicted, e.g., by a domain expert or other person. A request for confirmation/re-labeling can include, e.g.: (i) a mere request to indicate whether the previously assigned classification label is correct; and/or (ii) a request to designate a different label if the previously assigned classification label is incorrect. In response, a "reply classification label" is received. Such a reply classification label can comprise a mere designation (explicit or implicit) that the previously assigned classification label is correct and/or a different classification label which is believed to be more appropriate than the previously assigned classification label. As discussed in more detail below, depending upon the particular embodiment, the confirmation/re-labeling process optionally includes providing the user with the previously assigned classification label and/or a label that has been predicted for the subject training sample. Accordingly, if the user believes such label to be correct, he or she can implicitly designate it as such, e.g., by not selecting another label.

Thus, in step 14 of FIG. 2, one or more training sample(s) are selected from training set 45 and designated as selected training samples 77. In the representative system 40 shown in FIG. 3, such selection is performed by processing block 50, which includes prediction/modeling module 52 and comparison/selection module 53, with module 53 optionally considering certain other inputs 54.

In one representative embodiment, labels are predicted for some or all of the samples in training set 45 using prediction/modeling module 52. In the preferred embodiments, module 52 uses the classifier training module 5 (e.g., by applying module 5 ten times in a known-manner 10-fold cross-validation so that each item evaluated is not directly included in the training set of the classifier). However, in alternate embodiments of the invention: (i) module 52 uses the production classifier 3 (i.e., which is used to generate predictions 4 for unlabeled input samples 2); or (ii) a different classifier is used by prediction/modeling module 52.

In any event, the labels predicted by module 52 are supplied to comparison/selection module 53. In the preferred embodiments, module 53 compares such predicted labels to the labels 8 that were assigned via interface module 43. Then, based on that comparison, one or more sample(s) 77 are selected from training set 45.

The comparison and selection in module 53 can be performed in any of a variety of different ways. Often, a classifier generates a soft classification score and then makes a hard classification decision based on that score. For example, with respect to a binary classification task, a classifier might generate a soft classification score that falls within the range of [0, 1], with 0 representing the classifier's maximum confidence that the sample should not be classified into the subject category and 1 representing the classifier's maximum confidence that it should be classified into the category. At the same time, while it is possible for the classification labels 8 assigned through interface module 43 also to be soft (e.g., with a particular value corresponding to how well the subject sample fits within a particular category), in most cases the assigned classification labels 8 will constitute hard classification decisions (e.g., a binary decision of 0 or 1).

In either event, in one representative embodiment module 53 selects one or more of the samples from training set 45 that have the largest disparity between the label assigned through module 43 and the label predicted by module 52, designating such selections as selected samples 77. The measure of disparity can comprise, e.g., a simple difference, a ratio, or any other selected function.

Disparity measures of the foregoing types generally focus on individual training samples. However, disparity also can be evaluated in a broader sense, e.g., by considering a model that has been generated (e.g., in module 52) using the current training set 45 and identifying one or more samples from the training set 45 that appear to be inconsistent with such model, in such case designating the identified samples as selected samples 77. In this embodiment, rather than identifying individual samples that are farthest from their predicted labels, the system 40 identifies, e.g., a cluster of training samples within a region or subspace of the overall feature set that does not appear to conform to the model.

In certain embodiments, other considerations also (or instead) are taken into account in designating the selected training samples 77 in step 14 (of FIG. 2). One example is the effect that changing the assigned classification label 8 (e.g., to the label predicted by module 52) would have on classifier 3. This consideration is discussed in more detail below. Similarly, in certain embodiments comparison/selection module 53 also takes into account other inputs 54 (e.g., relating to the unlabeled samples 2 and their currently predicted labels 4), which also are discussed in more detail below.

In the event that only a single selected training sample 77 is to be identified, the sample from training set 45 that optimizes the specified selection criterion (which can include a set of different sub-criteria) preferably is chosen. On the other hand, the present inventors have found that users often respond better when presented with a group of samples to be labeled, particularly when the samples are similar to each other and/or arranged in a logical or intuitive manner. Accordingly, in certain embodiments of the invention, the selection criterion includes one or more sub-criteria biasing toward selection of related samples in training set 45. Such sub-criteria are implemented, in representative embodiments, by clustering the training samples based on their feature sets (e.g., using known clustering techniques). It is noted that the number of samples from training set 45 to be selected or the criterion for determining such number preferably is specified by a user of system 40.

In any event, upon the conclusion of step 14, one or more training sample(s) have been designated as selected training sample 77. In step 16, the samples 77 are submitted to the user 57 (which can be the same as user 44, or a different person or automated process) for confirmation/re-labeling. For this purpose, a user interface module 55 (shown in FIG. 3) preferably is used.

The way in which the selected training samples 77 are presented to the user 57 by labeling interface module 55 preferably is different in different embodiments of the invention. Some examples are illustrated in FIGS. 5-7.

Figure 5:
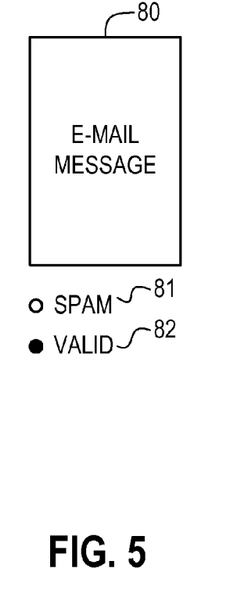
FIG. 5 illustrates an example of a user interface for presenting a training sample for confirmation/re-labeling according to a first representative embodiment of the present invention.

Specifically, FIG. 5 illustrates an example in which an incoming e-mail message 80 is being labeled as spam 81 or a valid e-mail message 82 (i.e., a binary classification problem). In the present example, the label 82 indicating a valid e-mail message has been pre-selected (e.g., by interface module 55), and the user 57 only needs to click on the radio button for spam label 81 if the user 57 disagrees with this pre-selection. Depending upon the particular sub-embodiment, the pre-selection is based either on the previously assigned classification label or the predicted class for the subject training sample 80. In either event, the task of assigning classification labels generally will be easier for the user 57.

Figure 6:
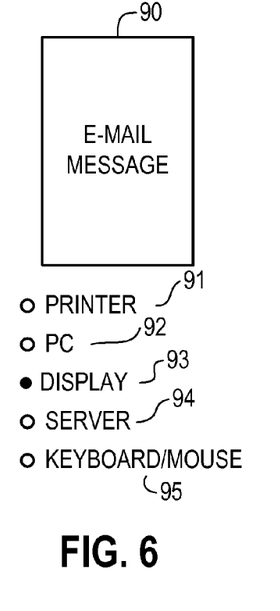
FIG. 6 illustrates an example of a user interface for presenting a training sample for confirmation/re-labeling according to a second representative embodiment of the present invention.

FIG. 6 illustrates a non-binary example in which an incoming e-mail message 90 is being labeled according to the category of subject matter (in this case, particular types of hardware) to which it most closely pertains. In the present example, the choices are printer 91, PC 92, display 93, server 94, or keyboard/mouse 95. Once again, a label (in this case, label 93) has been pre-selected, based either on the previously assigned classification label or the predicted classification label for e-mail message 90. Accordingly, the user 57 only needs to click on the appropriate radio button 91, 92, 94 or 95 if he or she disagrees with the pre-selection.

Figure 7:
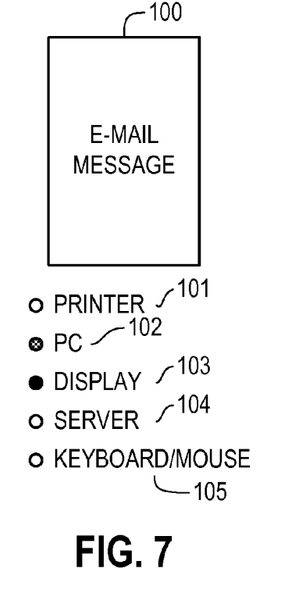
FIG. 7 illustrates an example of a user interface for presenting a training sample for confirmation/re-labeling according to a third representative embodiment of the present invention.

FIG. 7 illustrates a further example in which an incoming e-mail message 100 is being classified in the same manner as described above in connection with FIG. 6, with labels 101-105 corresponding to labels 91-95, respectively. In this case, not only is a label 103 pre-selected, but the conflicting label 102 also is highlighted. For example, in a specific embodiment label 102 is the previously assigned label and label 103 is the predicted label, or vice versa. Accordingly, the user 57 can do nothing if he or she agrees with the pre-selection, can click on the radio button associated with the conflicting label 102 (which has been highlighted and therefore is easy to identify) if that label is more appropriate, or can select a third label (from among labels 101, 104 and 105) if the user 57 disagrees with both the pre-selection 103 and the alternate 102. In still further embodiments, two or more alternates are highlighted where there are two or more close possibilities. In addition, in certain embodiments where the labels are not mutually exclusive, the user 57 has the ability to designate more than one label (e.g., where the e-mail message pertains both to a PC 102 and to its display 103) and/or more than one label is pre-selected by interface module 55.

In any event, in the preferred embodiments the selected training samples 77 provided for confirmation/re-labeling are presented in groups of related samples. More preferably, such samples preferably are presented in a logical order, e.g., according to their predicted labels, their previously assigned classification labels, a measure of the disparity between the previously assigned and the predicted labels, and/or the confidence of the classifier in the predicted labels. Depending upon the particular embodiments, the grouping or ordering is done spatially and/or temporally.

It is noted that although users 44 and 57 generally are described above as being human beings, either or both can comprise automated processes, either in whole or in part. In any event, user 57 preferably has more expertise, and/or at least is given additional time to assign classification labels, than user 44, with the desired goal being to obtain higher-quality classifications upon second or subsequent presentations. For example, in one embodiment an automated process (which is more processor-intensive than the production classifier) or a lower-level worker functions as user 44, while an actual human being or a higher-level employee, respectively, functions as user 57.

In one exemplary embodiment, the labels 8 are assigned in whole or in part by an automated process functioning as user 44 that assigns labels based on predefined negative inferences. For example, in a binary classification system an e-mail message that has been labeled as reporting a problem with a user's PC is assigned a negative label with respect to a category of reporting a problem with a server.

Absent some measures to ensure better classifications by user 57, there might be no effective way to determine who is correct in the event that user 44 and user 57 provided conflicting classifications. In such a case, the best alternative might be to provide the training sample 77 for a third labeling. On the other hand, the occurrence of conflicting label assignments might itself provide useful information to the training processor, e.g., indicating that the subject training sample is in fact a difficult sample to categorize, with different people categorizing it differently, or even with the same person categorizing it differently at different times or under different circumstances.

In order to address such a situation, certain embodiments allow the user 44 and/or 57 to designate the degree of difficulty that the subject user had in classifying the subject samples (e.g., clicking on radio buttons for different levels of difficulty, such as easy, somewhat difficult, very difficult or extremely difficult). The provided information then can be incorporated into the prediction model and used, e.g., to inform the training module to put less weight on such samples; for this purpose, there exist several known training techniques that consider weighted training samples. It is noted that the user interface for specifying degree of difficulty in assigning a label can be presented, in the various embodiments, for each labeling occurrence (including the initial labeling) or only when a training sample is resubmitted for labeling.

In any event, the confirmation/re-labeling information is received for the submitted training examples and, in step 18, that information is used to modify the training set 45 and then retrain the classifier 3, e.g., using training module 5 and the revised training set 45. In the present embodiment, there are two possibilities for each resubmitted training sample 77.

First, the previously assigned classification label 8 for the training sample 77 could have been confirmed by user 57. In that case, the training sample 77 preferably is returned to training set 45 with the same classification label 8. More preferably, the classification label 8 for the training sample 77 is tagged with a higher presumption of accuracy, so that it is less likely to be again selected for confirmation/re-labeling. In one representative embodiment, the presumption is absolute so that the subject sample 7 is never again resubmitted.

Figure 4:
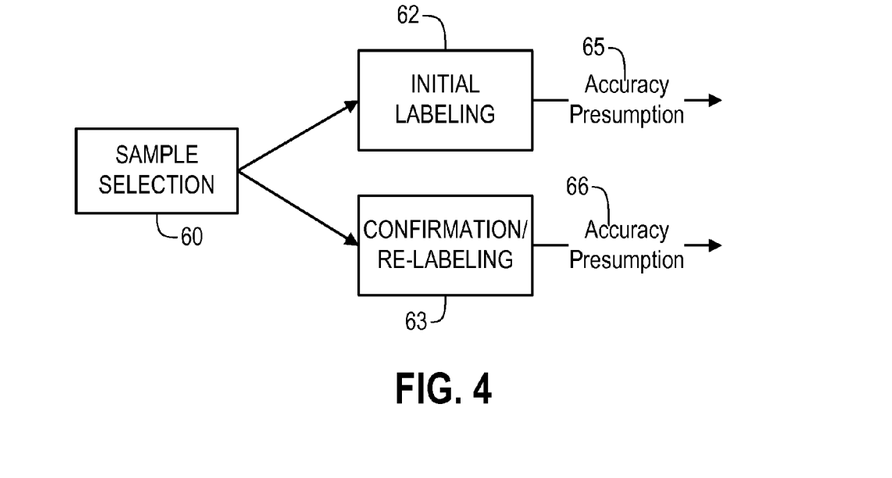
FIG. 4 illustrates a process for assigning labels according to a representative embodiment of the present invention.

Alternatively, the previously assigned classification label 8 for the training sample 7 could have been contradicted by user 57. The processing at this point preferably depends upon the particular embodiment, more preferably, on the presumptions that have been set by the users. Those presumptions, in turn, preferably track the manner in which classification labels are assigned, both by user 44 and by user 57. For example, if (as shown in FIG. 4) the users have set up the labeling process such that labeling by user 57 (i.e., with respect to samples 60 being submitted for confirmation/re-labeling 63) is expected to be much more reliable than labeling by user 44 (i.e., with respect to initial labeling 62), then the accuracy presumption 66 preferably is much higher than accuracy presumption 65, with the result that the new label 88 assigned by user 57 replaces the previous label 8. However, if the presumptions are not significantly different from each other, then additional processing preferably is performed, e.g., to determine whether the sample really is difficult to classify (even by a human domain expert) or to resolve the discrepancy (e.g., by submitting the sample for an additional label assignment together with a request to assess the difficulty of classifying the sample 77). In some embodiments, the user interface can also receive input indicating which sample/s are inherently difficult to classify, or even an indication that some should be removed from consideration entirely.

In any event, once the training set 45 has been updated, the classifier 3 is retrained using the modified training set 45 (e.g., by training module 5), and the retrained classifier 3 is used to re-process at least some of the labeled training samples 45, thereby obtaining new predictions 4. Upon completion of step 18, processing returns to step 14 to select additional samples from training set 45 and repeat the foregoing process.

The foregoing discussion focused primarily on the submission of existing samples within training set 45 and receipt of confirmation/re-labeling information for such samples. However, in the preferred embodiments samples are selected from both the set of unlabeled samples 2 and the set of training samples 45, with the particular selections based on a criterion that attempts to maximize overall benefit to the training process 5.

Figure 8:
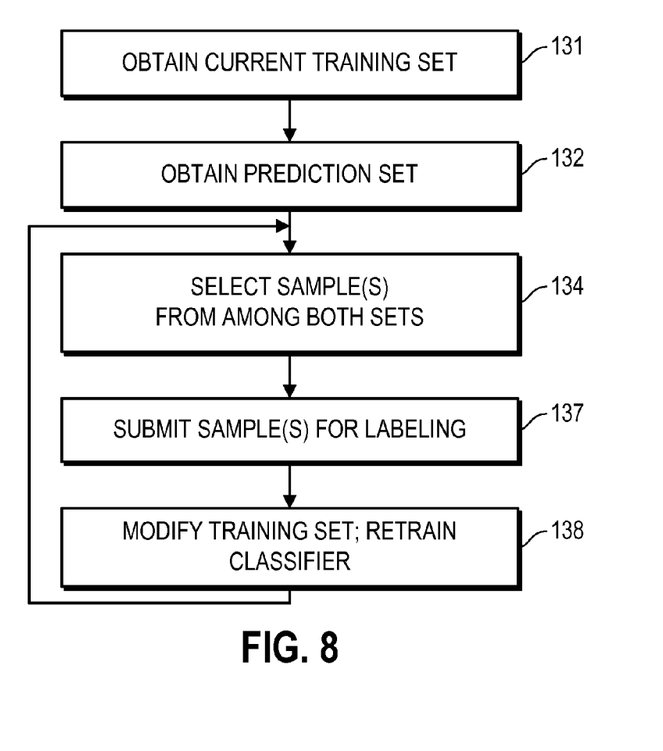
FIG. 8 is a flow diagram illustrating a machine-learning process according to a second representative embodiment of the present invention.
Figure 9:
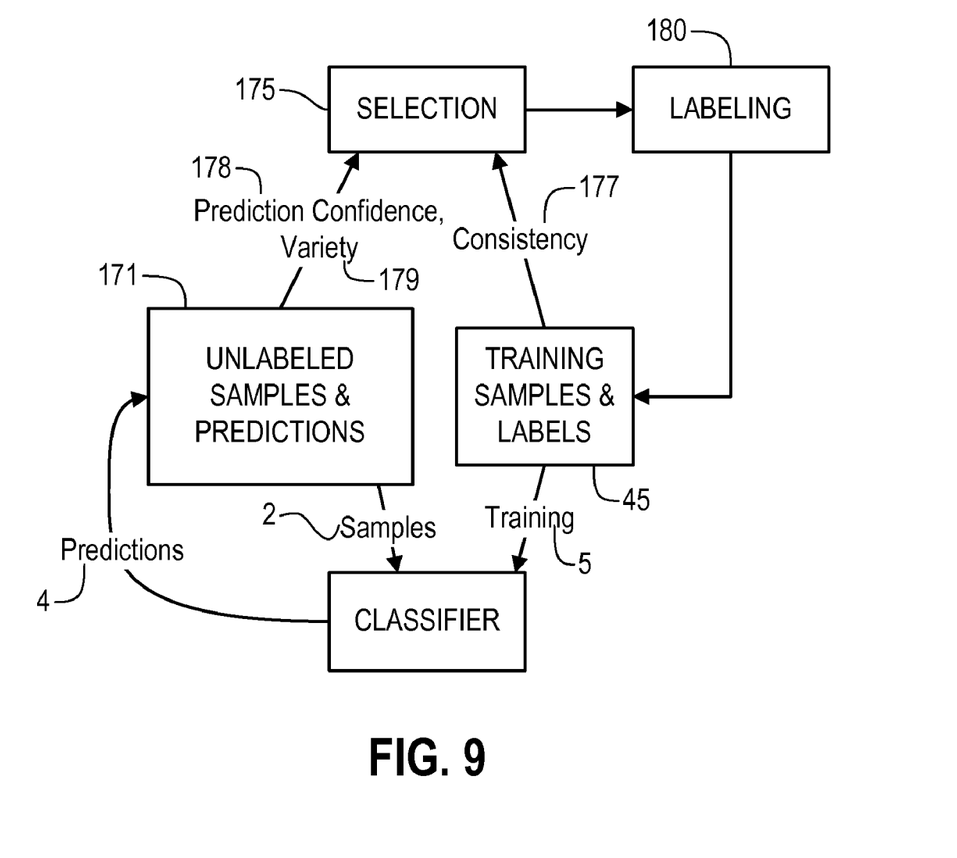
FIG. 9 is a block diagram illustrating the selection of samples from among labeled training samples and unlabeled samples, according to a representative embodiment of the present invention.

FIG. 8 provides a flow diagram illustrating certain exemplary techniques embodying this approach, with additional references to the block diagram shown in FIG. 9. Preferably, the entire process illustrated in FIG. 8 is implemented in software, e.g., by reading and executing software code from a computer-readable medium. It is noted that the same system 40 (shown in FIG. 3 and discussed above) can be used to implement the process shown in FIG. 8; in such a case, as discussed in more detail below, the other inputs 54 preferably include information regarding the unlabeled samples 2 and their predicted labels 4, together with information regarding particular unlabeled samples 2 that are potential candidates for labeling via interface module 55.

Referring to FIGS. 8 and 9, in step 131 the current training set 45 is obtained, and in step 132 a prediction set 171 is obtained, the latter including the unlabeled samples 2 and the currently predicted labels 4 for such samples 2.

In step 134, samples are selected 175 from among both training set 45 and prediction set 171, e.g., by evaluating samples in both such sets and selecting one or more based on a specified selection criterion. As illustrated in FIG. 9, this step is accomplished in the present embodiment by using a criterion that attempts to maximize the expected benefit from multiple different considerations, including but not limited to evaluation of: consistency 177 (e.g., questioning training label outliers), prediction confidence 178 (e.g., selection of samples with uncertain or unstable predictions), and variety 179 among the training samples. In other embodiments, the prediction-confidence consideration 178 can be replaced with any known active-learning technique that evaluates the importance of labeling individual cases or any other technique that attempts to identify samples for labeling.

Consistency 177 has been discussed above and generally is directed at ensuring that individual training samples or clusters of training samples are consistent with the prediction model that is being used by the production classifier 3. Preferably, this objective includes metrics designed to identify any samples in the training set 45 that can be considered to be outliers, i.e., samples whose assigned classification labels 8 are significantly different than what the classifier 3 (or prediction/modeling module 52 would predict for them). Conventional methods exist for identifying outliers (sometimes referred to in the literature as "noise labels"), typically for the purpose of ignoring them when training a classifier.

The considerations pertaining to prediction confidence 178 and variety 179 pertain to selection of samples from the prediction set 171, and information pertaining to such considerations generally is included within the information designated as other inputs 54 in system 40 (shown in FIG. 3).

The objective pertaining to prediction confidence 178 biases toward selecting samples for which the classifier 3 is most uncertain regarding its predicted classification label 4 (such as boundary samples). For example, in the binary classification example discussed above, the bias is toward samples whose soft classification label is close to 0.5.

Boundary samples can be selected, e.g., through conventional active-learning techniques. For example, boundary samples may be identified by selecting those examples having soft classification scores that are close to the decision threshold for specific hard classifications. Alternatively, boundary samples can be identified using a query-by-committee approach in which differently trained classifiers arrive at significantly different predictions (hard or soft) for the same sample. Conventionally, selection of boundary samples has been limited to previously unlabeled samples 2. However, in the present embodiments it is applied to samples in both the training set 45 (disregarding the assigned labels) and the prediction set 171.

That is, in certain embodiments of the invention prediction-confidence objective 178 is limited to selecting samples only from the prediction set 171 (i.e., unlabeled samples 2). In alternate embodiments, the prediction-confidence objective 178 is applied both to previously labeled training samples in set 45 and to unlabeled samples 2. In the latter types of embodiments, when applying the prediction-confidence objective 178 to the training samples in set 45, the previously assigned labels for such samples in set 45 preferably are ignored. In other words, the training samples in set 45 preferably are treated as unlabeled samples.

The variety objective 179 attempts to ensure that the training samples are as representative as possible of the entire diversity of samples that have been, or are likely to be, input for classification. Variety preferably is achieved by determining how well the various unlabeled samples 2 are represented by the training samples 7. In one embodiment of the invention, samples 2 are divided into clusters (e.g., using conventional clustering techniques), and each cluster is evaluated to determine whether it is proportionally represented by samples in training set 45. Selection is then biased toward samples in under-represented clusters, e.g., by forcing selection from such under-represented clusters until balance is restored. In alternate embodiments, a distance measure is constructed as a function of distance from the unlabeled samples 2 to the samples in training set 45 (e.g., using the sum of the distances from each unlabeled sample 2 to the nearest sample in training set 45), and then biasing selection toward samples having larger distance measures in their immediate vicinity (e.g., multiplying by a factor that is based on the distance measure).

In addition to the foregoing considerations, a measure of the effect of requesting that particular sample be labeled 180 (either for the first time or for confirmation) preferably is taken into account. For example, in one embodiment a fixed number of the closest boundary samples, the farthest outliers, and to the best candidates to achieve improved variety (e.g., 1, 2 or 3 of each) are identified and then the expected effect of requesting labeling 180 for each is evaluated. The measure of the effect can be determined by assuming the classification of each sample would be reversed (or, for non-binary classification problems, changed to the next closest category) if submitted for labeling 180 and then determining how big of an impact such a change would have on the classifier 3 (e.g., accuracy, F-measure, precision, recall, quantification, etc.).

In other embodiments, a cumulative score reflecting all three considerations (consistency 177, prediction confidence 178 and variety 179) is assigned to each sample, and the samples having the highest cumulative scores are evaluated for expected effect, e.g., in a similar manner. For samples that have not yet been labeled, no consistency measure is available; in such cases, for example, a default value of zero can be assumed when computing a weighted average of all three considerations. In still further embodiments, the cumulative score is adjusted to account for the effect measure, and the sample(s) having the highest adjusted scores are selected.

In addition, in certain embodiments of the invention the selections are constrained so that the samples are of the same type (e.g., clustered within the same region of the feature space), thereby resulting in a group of similar samples to be provided for labeling 180. Such a constraint, while potentially producing a less optimal sample set than otherwise would be obtained, often has the offsetting advantage that the user will find it easier to label a group of similar samples.

Other factors preferably also are taken into consideration. For example, certain embodiments incorporate a bias toward selecting samples from training set 45 whose assigned labels have a lower presumption of accuracy. Such a presumption might apply, e.g., in situations where the labels were assigned: (i) hastily by a human being, (ii) by a source of training labels that subsequently has been found to be less competent, or (iii) as a result of a negative inference, as discussed above. Such a bias is applied, e.g., by multiplying the cumulative adjusted score of each sample in training set 45 by a factor that is based on the presumed accuracy of its corresponding assigned classification label 8.

Likewise, instead of assuming that the label for an individual sample will be reversed, in one representative embodiment of the invention, the change effect to classifier 3 is modified by the degree of expectation that the label in fact would be reversed. Such an expectation can be provided by a soft classification score output by the classifier 3 itself. In such embodiments, the classifier 3 preferably is roughly calibrated to provide soft classification scores that correspond to such expectations, e.g., using calibration techniques known in the art, such as calibration based on a cross-validation calculation performed using later-identified actual classification labels.

In step 137, the samples selected in step 134 are presented to the user for labeling 180. In representative embodiments, the samples are presented in an ordered manner, e.g., sorted by a determined degree of likelihood that the samples are a member of a particular class.

Finally, in step 138 the training set 45 is modified based on the labels received in step 137, the classifier 3 is retrained based on the modified training set 45, and at least some of the samples 2 and 7 are reprocessed using classifier 3. This step is similar to step 18 in FIG. 2, and the same considerations apply here.

Thereafter, processing returns to step 134 in order to select 175 the next sample or set of samples and to repeat the foregoing process.

In the preferred implementation of the foregoing process, 5-20 samples are selected 175 for labeling, sorted by their prediction strength (e.g. probability of belonging to the positive class according to the current classifier), and presented to the user 57 in a single screen. If the classifier 3 is reasonably accurate, the positive samples will be mostly gathered together, making it easier for the user 57 to group-select them and label them positive (same for the negative samples), with a few individual clicks to treat the exceptions.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

In certain instances, the foregoing description refers to clicking or double-clicking on user-interface buttons, dragging user-interface items, or otherwise entering commands or information via a particular user-interface mechanism and/or in a particular manner. All of such references are intended to be exemplary only, it being understood that the present invention encompasses entry of the corresponding commands or information by a user in any other manner using the same or any other user-interface mechanism. In addition, or instead, such commands or information may be input by an automated (e.g., computer-executed) process.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of machine learning, comprising:
   (a) obtaining a training set that includes training samples and corresponding assigned classification labels;
   (b) training an automated classifier against the training set;
   (c) selecting at least one of the training samples;
   (d) requesting confirmation/re-labeling of said at least one training sample;
   (e) in response to step (d), receiving a reply classification label for said at least one training sample;
   (f) retraining the automated classifier using the reply classification label; and, predicting a label for said at least one training sample,
   wherein said at least one training sample is selected in step (c) based on a comparison between the assigned classification label and the predicted label for said at least one training sample.

2. A method according to claim 1, wherein said at least one training sample is selected in step (c) after considering for possible selection a group of samples that includes a plurality of the training samples and a plurality of unlabeled samples.

3. A method according to claim 1, wherein the reply classification label has been assigned by a human being.

4. A method according to claim 1, wherein said requesting step (d) comprises providing the predicted label for said at least one training sample to a user and asking the user to indicate whether the predicted label for said at least one training sample is correct.

5. A method according to claim 1, wherein in said requesting step (d) plural training samples are presented for confirmation/re-labeling as a group, arranged based on predicted labels for said plural training samples.

6. A method according to claim 1, said requesting step (d) comprises providing the assigned classification label and the predicted label for said at least one training sample to a user and allowing the user to select one of the assigned classification label and the predicted label for said at least one training sample.

7. A method according to claim 1, wherein plural similar training samples are selected and presented for confirmation/re-labeling, as a group of similar training samples, in said requesting step (d).

8. A method according to claim 1, further comprising a step of tagging the reply classification label for said at least one training sample as having a stronger presumption of accuracy than the assigned classification label for said at least one training sample.

9. A method according to claim 1, wherein said at least one training sample is selected based on at least one of: (i) an estimation of an effect of changing the assigned classification label for said at least one training sample; (ii) a result of a cross-validation calculation; (iii) a score representing a fit of the at least one training sample to a model based on the training set; (iv) an active-learning calculation; (v) a consistency evaluation; (vi) a prediction-confidence evaluation; (vii) a variety evaluation; and (viii) a calculated measure indicating confidence in the assigned classification label for said at least one training sample.

10. A method of supplementing training for a machine-learning classifier, comprising:
(a) obtaining a training set that includes training samples and corresponding assigned classification labels, the training set having been used to train a machine-learning classifier;
(b) obtaining a set of unlabeled samples;
(c) selecting a sample from among the training set and the set of unlabeled samples based on a specified selection criterion that involves evaluation of a plurality of both the training samples and the unlabeled samples;
(d) submitting the selected sample for labeling and, in response, receiving a reply classification label for the selected sample; and
(e) retraining the machine-learning classifier using the selected sample and the reply classification label for the selected sample,
wherein the specified selection criterion comprises predicting labels for a group of the training samples and comparing the predicted labels to the assigned classification labels for the group of training samples.

11. A method according to claim 10, further comprising a step of repeating steps (c)-(e) a plurality of times, and wherein in the repetitions of step (c) samples are selected from both the training set and from the set of unlabeled samples.

12. A method according to claim 10, wherein the specified selection criterion further comprises calculating a score for each training sample and for each unlabeled sample using an active-learning technique.

13. A method according to claim 12, wherein the selected sample is selected in step (c) based on calculated scores from among samples in the training set and samples in the set of unlabeled samples.

14. A method according to claim 10, wherein the specified selection criterion comprises a variety constraint which biases toward selecting additional training samples in subspaces where the unlabeled samples are inadequately represented by the training samples.

15. A method according to claim 10, wherein plural similar samples are selected in step (c) and submitted, as a group of similar training samples, in step (d).

16. A method according to claim 10, wherein plural selected samples are selected in step (c) and submitted in step (d) for labeling as a group, arranged based on predicted labels for said selected samples.

17. A method according to claim 10, wherein in step (d) the selected sample is submitted together with a designated label and a request to confirm whether the designated label is correct.

18. A method of supplementing training for a machine-learning classifier, comprising:
(a) obtaining a training set that includes training samples and corresponding assigned classification labels, the training set having been used to train a machine-learning classifier;
(b) obtaining a set of unlabeled samples;
(c) selecting a sample from among the training set and the set of unlabeled samples based on a specified selection criterion that involves evaluation of a plurality of both the training samples and the unlabeled samples;
(d) submitting the selected sample for labeling and, in response, receiving a reply classification label for the selected sample; and
(e) retraining the machine-learning classifier using the selected sample and the reply classification label for the selected sample,
wherein plural selected samples are selected in step (c) and submitted in step (d) for labeling as a group, arranged based on predicted labels for said selected samples.

* * * * *

UNITED STATES PATENT AND TRADEMARK OFFICE
CERTIFICATE OF CORRECTION

| | | |
|---|---|---|
| PATENT NO. | : 7,792,353 B2 | Page 1 of 1 |
| APPLICATION NO. | : 11/555036 | |
| DATED | : September 7, 2010 | |
| INVENTOR(S) | : George Forman et al. | |

It is certified that error appears in the above-identified patent and that said Letters Patent is hereby corrected as shown below:

In column 12, lines 37-38, in Claim 1, delete "label; and, predicting a label for said at least one training sample," and
insert -- label; and,
    predicting a label for said at least one training sample, --, therefor.

In column 13, line 10, in Claim 9, delete "cross- validation" and insert -- cross-validation --, therefor.

Signed and Sealed this
Eighth Day of March, 2011

David J. Kappos
*Director of the United States Patent and Trademark Office*